(12) United States Patent
Moore (10) Patent No.: US 10,736,307 B1
(45) Date of Patent: Aug. 11, 2020

(54) FISHING LURE AND MOLD THEREFORE

(71) Applicant: Andre Moore, Alabaster, AL (US)

(72) Inventor: Andre Moore, Alabaster, AL (US)

( * ) Notice: Subject to any disclaimer, the term of this patent is extended or adjusted under 35 U.S.C. 154(b) by 313 days.

(21) Appl. No.: 15/861,632

(22) Filed: Jan. 3, 2018

(51) Int. Cl.
   *A01K 85/16* (2006.01)

(52) U.S. Cl.
   CPC .................. *A01K 85/16* (2013.01)

(58) Field of Classification Search
   CPC ........................................... A01K 85/16
   USPC ...................................... 43/42.24
   See application file for complete search history.

(56) References Cited

U.S. PATENT DOCUMENTS

| | | | | |
|---|---|---|---|---|
| 4,069,610 A * | 1/1978 | Firmin | .............. | A01K 85/16 43/42.24 |
| 4,214,396 A * | 7/1980 | Firmin | .............. | A01K 85/00 43/42.1 |
| 4,471,556 A * | 9/1984 | Dworski | .............. | A01K 85/16 43/42.23 |
| 4,592,161 A * | 6/1986 | Smith | .............. | A01K 85/00 43/42.24 |
| 4,709,501 A * | 12/1987 | Garst | .............. | A01K 85/00 43/42.24 |
| 4,744,168 A * | 5/1988 | McClellan | .............. | A01K 85/00 43/42.24 |
| 4,920,686 A * | 5/1990 | McGahee | .............. | A01K 85/01 43/42.1 |
| 5,142,811 A * | 9/1992 | Freeman | .............. | A01K 85/00 43/42.06 |
| 5,465,523 A * | 11/1995 | Garst | .............. | A01K 85/00 43/42.24 |
| 5,934,006 A * | 8/1999 | Stevenson | .............. | A01K 85/00 43/42.06 |
| 5,943,811 A * | 8/1999 | Packer | .............. | A01K 85/00 43/42.06 |
| 6,634,135 B1 * | 10/2003 | Rydell | .............. | A01K 83/00 43/42.1 |
| 6,775,945 B2 * | 8/2004 | Gibbs | .............. | A01K 85/00 43/42.28 |
| 6,843,017 B1 * | 1/2005 | Chambers, Sr. | ....... | A01K 85/00 43/42.24 |
| 7,774,974 B1 * | 8/2010 | Parks | .............. | A01K 85/01 43/42.24 |
| 7,980,019 B2 * | 7/2011 | Kalnas | .............. | A01K 85/18 43/42.1 |
| 8,544,204 B2 * | 10/2013 | Davis | .............. | A01K 85/00 43/42.24 |
| 10,398,135 B1 * | 9/2019 | Morales | .............. | A01K 85/16 |

(Continued)

FOREIGN PATENT DOCUMENTS

DE         2533492 A1 *  2/1977    ............. A01K 85/16

*Primary Examiner* — Christopher P Ellis
(74) *Attorney, Agent, or Firm* — C. Brandon Browning; Maynard, Cooper & Gale, PC (57) ABSTRACT

A soft plastic fishing lure configured for mimicking the movement patterns of animals that rely upon undulatory locomotion movement to propel themselves through water, the lure including a body forming an anterior portion and a tail forming a posterior portion, the tail including a plurality of spaced-apart, opposing laterally extending portions and a plurality of spaced-apart, opposing slots. A U-shaped transition section couples the body with the tail and is arranges to orient the tail so that it extends substantially anteriorly along at least half of a length of the body when the lure is relaxed.

4 Claims, 5 Drawing Sheets

(56) References Cited

U.S. PATENT DOCUMENTS

| | | | |
|---|---|---|---|
| 2003/0159331 A1* | 8/2003 | Pasley | A01K 85/00 43/42.39 |
| 2003/0192227 A1* | 10/2003 | Stava, III | A01K 85/00 43/42.24 |
| 2005/0204607 A1* | 9/2005 | Nichols | A01K 85/00 43/42.37 |
| 2007/0144055 A1* | 6/2007 | Warczok | A01K 85/00 43/42.49 |
| 2007/0175083 A1* | 8/2007 | Wilson | A01K 85/00 43/42.15 |
| 2008/0127542 A1* | 6/2008 | Young | A01K 85/00 43/42.36 |
| 2008/0168700 A1* | 7/2008 | Kim | A01K 85/00 43/42.24 |
| 2009/0090041 A1* | 4/2009 | Brick | A01K 85/00 43/42.47 |
| 2010/0050497 A1* | 3/2010 | Brown | A01K 85/00 43/42.24 |
| 2011/0197493 A1* | 8/2011 | Kwong | A01K 85/01 43/42.06 |
| 2014/0259868 A1* | 9/2014 | Wilson | A01K 85/00 43/42.24 |
| 2017/0265444 A1* | 9/2017 | Wedam | A01K 99/00 |

\* cited by examiner

FISHING LURE AND MOLD THEREFORE

FIELD OF INVENTION

The present invention is directed to a fishing lure and, more particularly, a plastic fishing lure configured for imparting a desired locomotion movement pattern to the lure when the lure is retrieved through water as a desired rate.

BACKGROUND OF INVENTION

A fishing lure is a type of artificial fishing bait that is designed to attract a fish. Fishing lures use color, vibration and movement to entice fish. Soft plastic fishing lures refer to plastic-based baits termed so because of their soft, flexible rubber texture. Such lures are typically manufactured by injecting a plastic composed of polymers such as polyvinyl alcohol (PVOH) or polyvinyl chloride (PVC) into a mold consisting of two metal blocks, each block including depressions for receiving the plastic. The blocks are fitted together with the depressions overlapping one another to form a void having a desired shape. Molten plastic is then injected into the mold void. Once the plastic cools, the blocks are separated revealing a plastic fishing lures exhibiting the desired shape of the void.

Soft plastic fishing lures are designed to imitate the appearance and movement fish or other food sources when retrieved through water. One class of food sources soft plastic baits attempt to mimic is anguilliform aquatic animals, which exhibit undulatory locomotion. This type of motion is characterized by wave-like movement patterns that act to propel an animal forward through water. Although this is typically the type of gait utilized by limbless animals, some creatures with limbs, such as salamanders, choose to forgo use of their legs in certain environments and exhibit undulatory locomotion. In the anguilliform group, there is little increase in the amplitude of the flexion wave as it passes along the body.

Another class of food sources soft plastic baits attempt to mimic is sub-carangiform aquatic animals. This group has a more marked increase in wave amplitude along the body with the vast majority of the work being done by the rear half of the fish. In general, the fish body is stiffer, making for higher speed but reduced maneuverability. Trout, minnows, carps, cods and salmon use sub-carangiform locomotion.

Another class of food sources soft plastic baits attempt to mimic is carangiform aquatic animals. The carangiform group is stiffer and faster-moving than the previous groups. The vast majority of movement is concentrated in the very rear of the body and tail. Carangiform swimmers generally have rapidly oscillating tails. Mackerels, herrings and jacks use carangiform locomotion.

Yet another class of food sources soft plastic baits attempt to mimic is thunniform aquatic animals. The thunniform group contains high-speed long-distance swimmers, and is a unique trait of the tunas. Here, virtually all the sideways movement is in the tail and the region connecting the main body to the tail (the peduncle). Thunniform locomotion is found in some mammals.

Although soft plastic fishing lures are available that attempt to mimic the various types of locomotion movement patterns described, in order for these baits to exhibit such movement patterns, the lures must be retrieved through water at a relatively fast speed. Often, the fast speeds do not correspond to the actual speeds presented by the natural foods sources the lures are attempting to mimic. For this reason, there are needed soft plastic fishing lures that exhibit the natural locomotion movement patterns of fish food sources when retrieved through water at speeds that mimic the speed of the food sources being mimicked.

BRIEF SUMMARY OF THE INVENTION

The present invention is directed to soft plastic fishing lures that exhibit desired locomotion movement patterns when the fishing lures are retrieved through water at desired speeds. Depending on the length and configuration of the lures, the lures may be arranged to mimic anguilliform, sub-carangiform, carangiform or thunniform aquatic animals.

According to one aspect of the invention, there is provided a soft plastic fishing lure including an anterior end portion configured for securing to a fishing line, a posterior end portion configured to trail the anterior end portion when the anterior end portion is pulled through water, an elongate body having a ventral side and a dorsal side, the body including the anterior end portion, and an elongate tail having a ventral side and a dorsal side, the tail including the posterior end portion. When the fishing lure is in a relaxed state, the tail may extend substantially anteriorly along the dorsal side of the body. By relaxed state, it is meant that the plastic material of the lure exhibits no elastic deformation, for example, when the fishing lure is located within the mold void of the mold in which the fishing lure was formed. In a relaxed state, the fishing lure size, shape, alignment and dimensions are identical to that of the lure at the time it was formed within a mold.

In one embodiment, a substantially U-shaped transition section couples the body with the tail. In this embodiment, the tail extends anteriorly from the transition section. Depending on the desired movement pattern of the tail, the tail may extend along the dorsal side of the body a distance sufficient to position the posterior end portion of the tail adjacent to the anterior end portion of the body. In other instances, the tail may extend along at least half of a length of the dorsal side of the body, at least 75% of a length of the dorsal side of the body or at least 95% of a length of the dorsal side of the body.

In another embodiment, the tail includes an elongate medial portion extending to and between the transition section and the posterior end portion. A plurality of spaced-apart, opposing laterally extending portions extend laterally from the medial portion, each of the opposing laterally extending portions including a left lateral portion extending laterally from a left face of the medial portion and a right lateral portion extending laterally from a right face of the medial portion. Interspersed between adjacent opposing laterally extending portions are spaced-apart, opposing slots. Each of the opposing slots includes a left lateral portion extending and opening laterally from the left face of the medial portion and a right lateral portion extending and opening laterally from the right face of the medial portion. The opposing laterally extending portions and the opposing slots impart an undulatory locomotion movement pattern to the tail when the fishing lure is retrieved through water.

According to another aspect of the invention, there is provided a plastic fishing lure including an anterior end, a posterior end and a length extending to and between the anterior end and the posterior end, the length being no less than about 14 cm. The lure further includes a body having a dorsal side, a ventral side and a body length of no less than about 3 cm and a tail having a tail length of no less than about 6 cm. When the fishing lure is in a relaxed state, the tail extends substantially anteriorly along about 50% to about 100% of the body length.

In one embodiment, the tail includes an elongate medial portion having a right face and a left face and a plurality of spaced-apart, opposing laterally extending portions. Each of the opposing laterally extending portions include a left lateral portion extending laterally from the left face of the medial portion and a right lateral portion extending laterally from the right face of the medial portion. When the body is retrieved through water, the tail trails behind the body and exhibits undulatory locomotion movement as a result of water flowing across the opposing laterally extending portions.

In another embodiment, the tail includes an elongate medial portion having a right face and a left face and a plurality of spaced-apart, opposing slots. Each of the opposing slots includes a left lateral portion extending and opening laterally from the left face of the medial portion and a right lateral portion extending and opening laterally from the right face of the medial portion. When the body is retrieved through water, the tail trails behind the body and exhibits undulatory locomotion movement as a result of water flowing across the opposing laterally extending slots.

According to another aspect of the invention, there is provided a plastic fishing lure including a body forming an anterior portion of the fishing lure and a tail forming a posterior portion of the fishing lure. The tail includes an elongate medial portion having a first face and an opposing second face, and a plurality of spaced-apart, opposing laterally extending portions. Each of the opposing laterally extending portions includes a first lateral portion extending laterally from the first face of the medial portion and a second lateral portion extending laterally from the second face of the medial portion. The tail further includes a plurality of spaced-apart, opposing slots, each of the opposing slots including a first lateral portion extending and opening laterally from the first face of the medial portion and a second lateral portion extending and opening laterally from the second face of the medial portion. A substantially U-shaped transition section couples the body with the tail.

In one embodiment, when the fishing lure is in the relaxed state, the tail extends substantially anteriorly along at least half of a length of the body. In another embodiment, the anterior portion is adjacent to the posterior portion. In yet another embodiment, the body includes a dorsoventral axis that extends dorsally through the tail and an anteroposetrior axis that does not extend through the tail.

According to yet another embodiment of the invention, there is provided a plastic fishing lure including a head, a tail, and a body extending to and between the head and tail, the body including a medial portion having a first face and an opposing second face, a plurality of spaced-apart, opposing laterally extending portions extending laterally from the medial portion and opposing slots separating adjacent ones of the laterally extending portions from one another. When the fishing lure is in a relaxed state, the fishing lure includes a first anteroposterior axis and a second anteroposterior axis, the first anteroposterior axis intersecting the second anteroposterior axis in the body at an angle. The angle may range between 45° and 175° and 90° and 170°.

In one embodiment the angle is intersected by a dorsoventral axis of the fishing lure. In another embodiment, the first anteroposterior axis extends through the head and the second anteroposterior axis extends through the tail.

BRIEF DESCRIPTION OF DRAWINGS

The disclosure can be better understood with reference to the following drawings. The elements of the drawings are not necessarily to scale relative to each other, emphasis instead being placed upon clearly illustrating the principles of the disclosure. Further, like reference numerals designate corresponding parts throughout the several views.

DETAILED DESCRIPTION OF THE INVENTION

Figure 1:
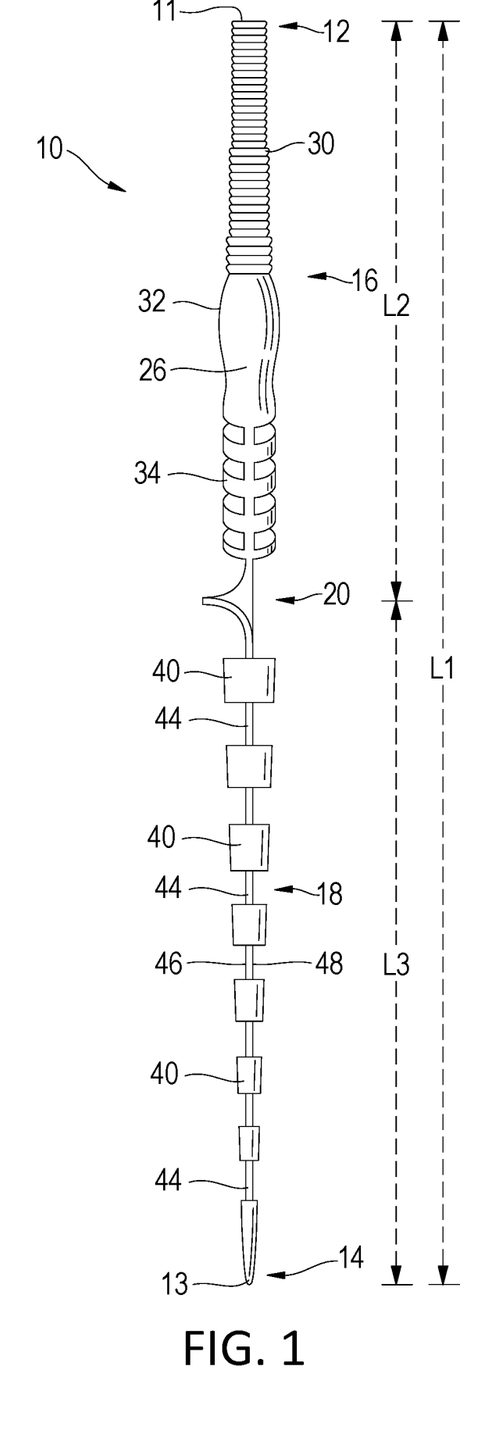
FIG. 1 is an plan view of a dorsal side of a soft plastic fishing lure in accordance with the present invention illustrating the lure suspended vertically from an anterior end portion thereof.
Figure 2:
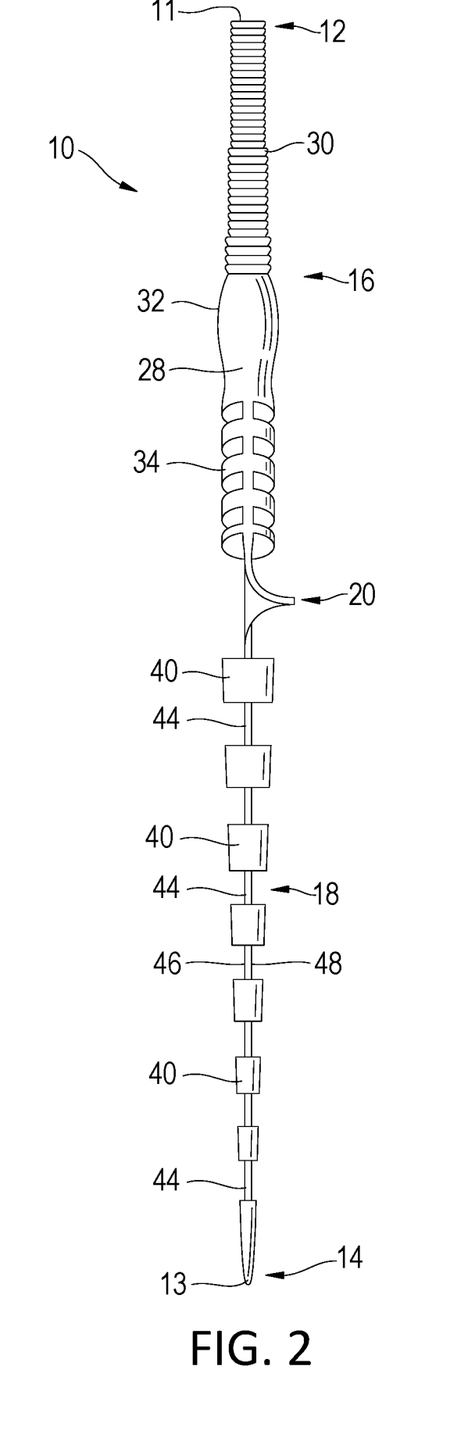
FIG. 2 is an plan view of a ventral side of the soft plastic fishing lure of FIG. 1.
Figure 3:
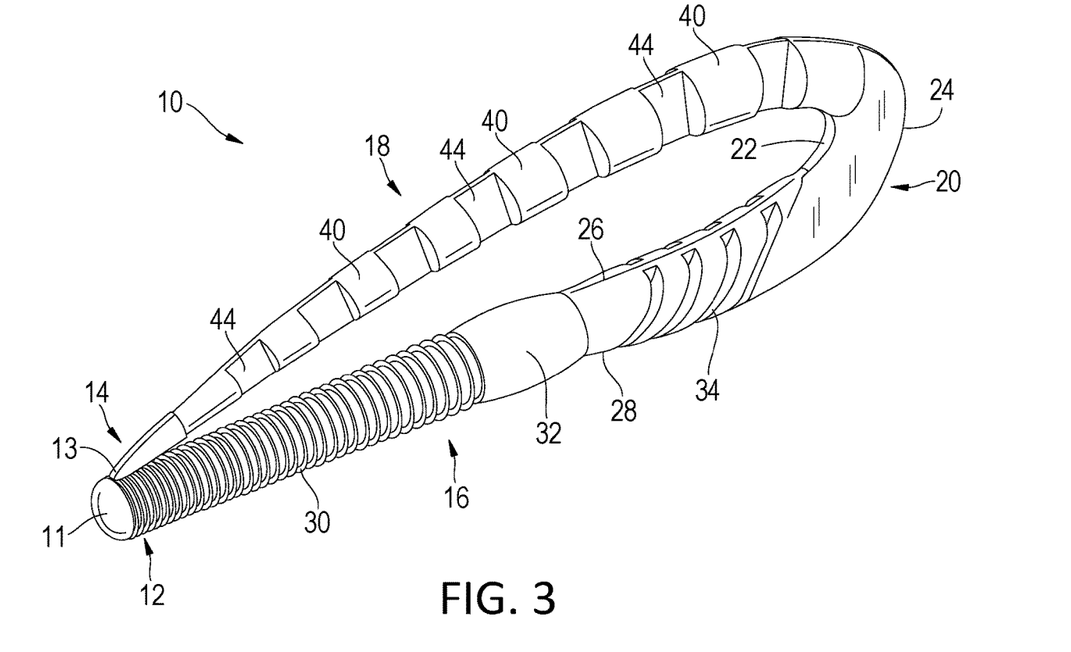
FIG. 3 is a perspective view of the fishing lure of FIG. 1 illustrating the lure in a relaxed state.
Figure 7:
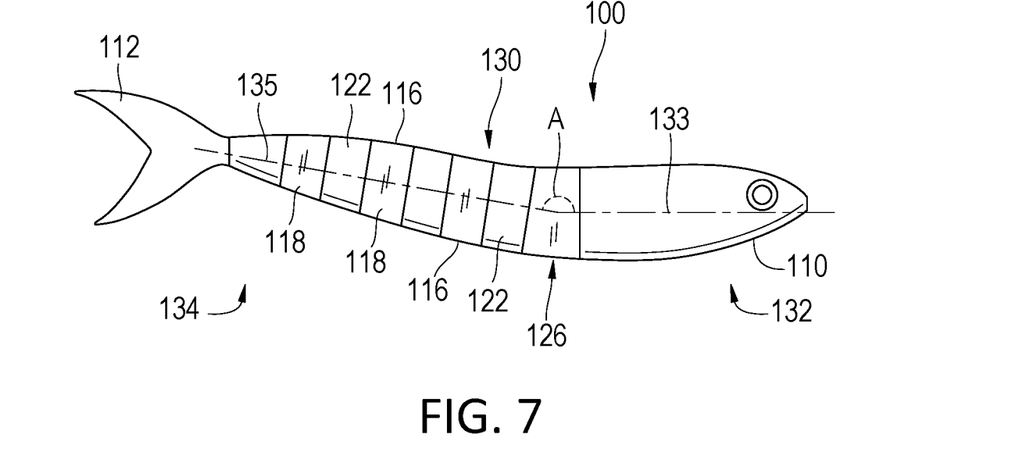
FIG. 7 is an elevational view of a lateral side of a soft plastic fishing lure in accordance with the present invention.
Figure 8:
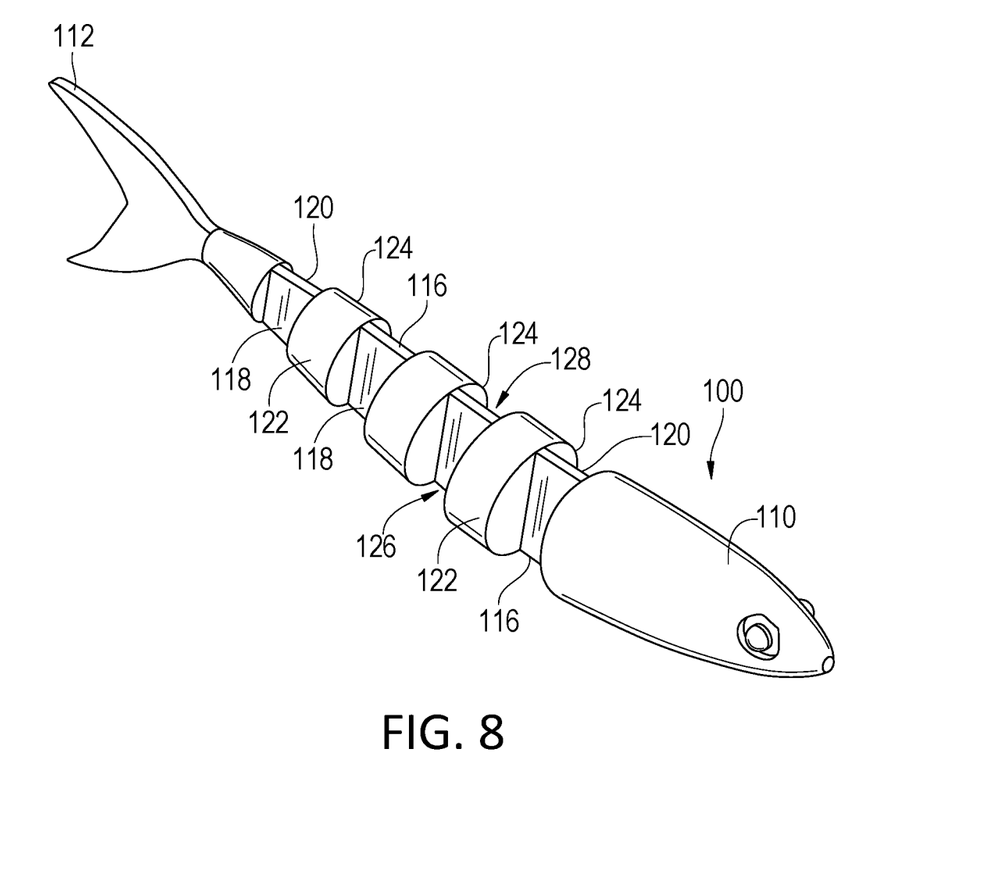
FIG. 8 is a perspective view of the soft plastic fishing lure of FIG. 7.

The present invention is directed generally to a soft plastic fishing lure that is configured for mimicking the movement pattern and speed of animals upon which a target fish feeds. FIGS. 1 through 3 illustrate a lure configured for mimicking anguilliform animals. Such animals use an undulatory locomotion movement to propel themselves through water including, for example, snakes, leeches, lampreys and eels. FIGS. 7 and 8 illustrate a lure that may be configured to mimic sub-carangiform, carangiform or thunniform animals. Such animals include minnows. As explained in more detail below, the desired movement patterns are achieved by including opposed and alternating slots and extending portions along the tail and/or body of the lures, while the ability of the tail and/or body to exhibit such movement patterns at desired speeds is achieved by including a transition section in the body or tail of the lure that effectively divides the lure into anterior and posterior sections which are off-set from one another along their respective anteroposterior axes.

More particularly, as illustrated in FIGS. 1 through 5, the present invention includes a soft plastic fishing lure 10 having an anterior end portion 12 corresponding to a head of a mimicked animal, a posterior end portion 14 corresponding to a caudal portion of the animal, a length L1 extending to and between respective end surfaces 11, 13 of portions 12 and 14, an elongate body 16 extending posteriorly from end surface 11 and a tail 18 extending anteriorly from end surface 13. A transition section 20 extends to and between body 16 and tail 18 thereby coupling the body with the tail. Lure 10 is intended to mimic anguilliform aquatic species.

Figure 5:
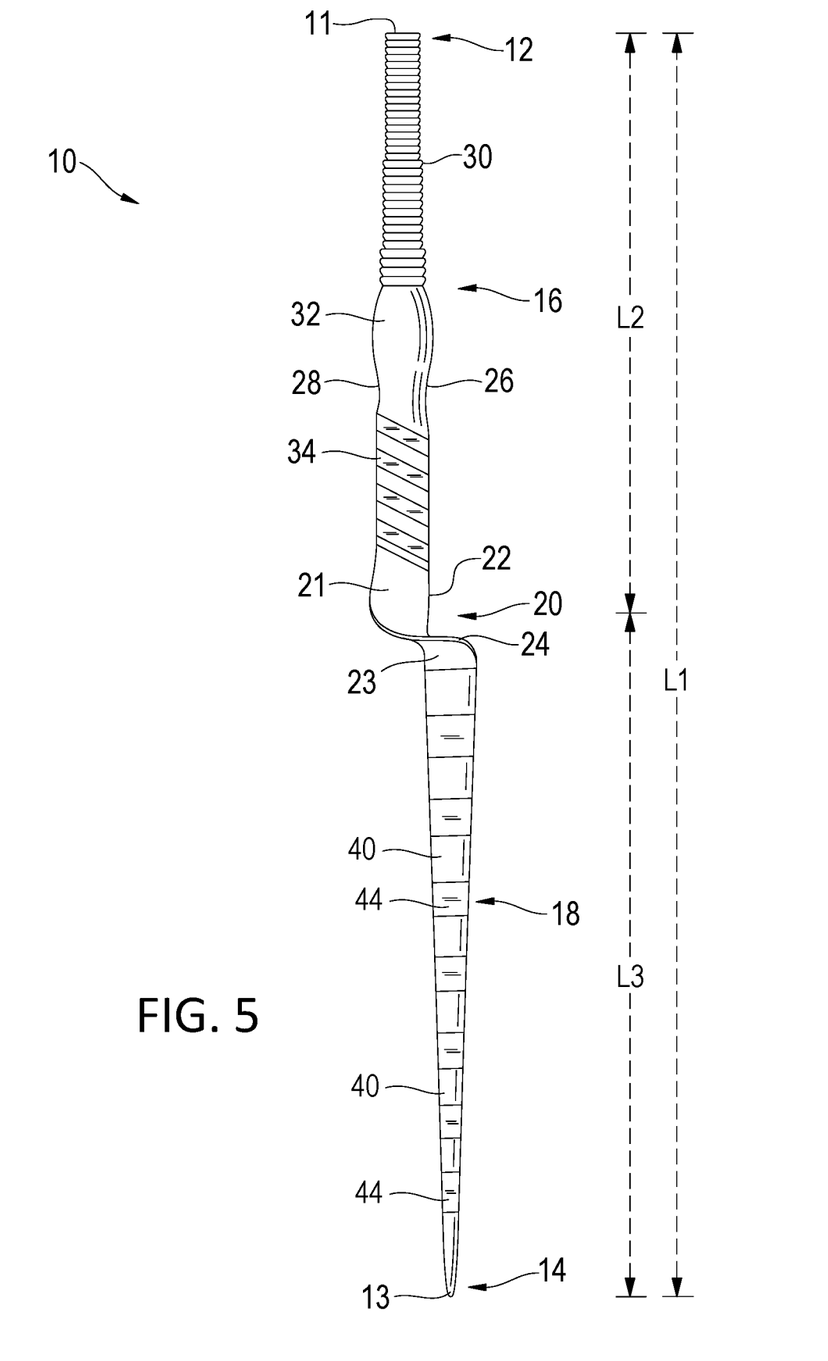
FIG. 5 is an elevational view of a lateral side of the fishing lure of FIG. 1.

Transition section 20 presents as a relatively thin piece of plastic material including opposing faces 21, 23 coupled to one another by an inside surface 22 and an opposing outside surface 24. Inside surface 22 extends from a dorsal side of body 16 and is shorter than outside surface 24, and outside surface 24 extends from a ventral side of body 16. As illustrated in FIGS. 1, 2 and 5, when lure 10 is suspended from anterior end 12, inside surface 22 is essentially straight and extends parallel to a longitudinal axis of body 16, while outside surface 24 and opposing faces 21, 23 form a 90° twist that transitions opposing faces 21, 23 from a left-right lateral facing orientation to a dorsoventral orientation moving posteriorly from body 16.

Figure 4:
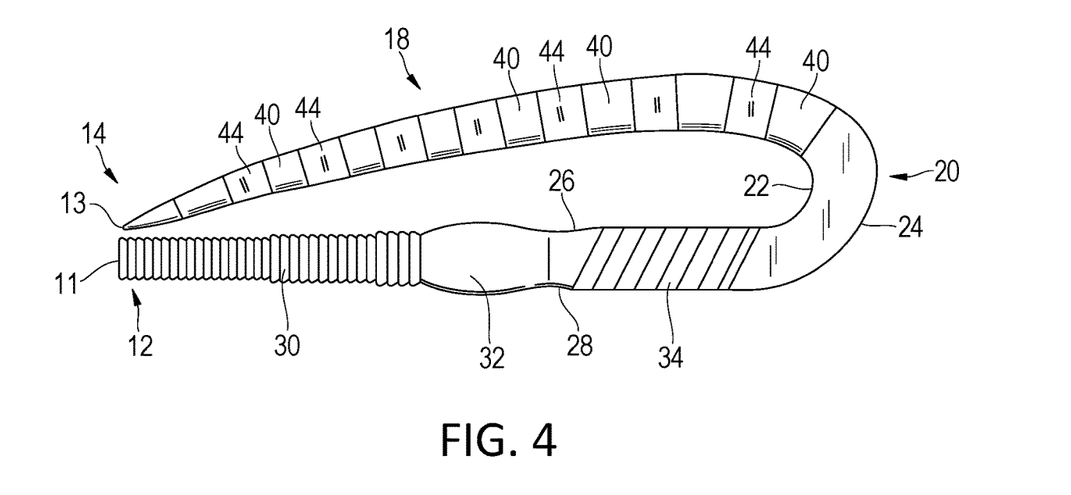
FIG. 4 is an elevational view of a right lateral side of the fishing lure of FIG. 3.

Referring to FIGS. 3 and 4, body 16 includes a dorsal side 26, a ventral side 28 and length L2 that extends from end surface 11 to a plane that is arranged tangentially to inside surface 22 and perpendicular to an anteroposterior axis of body 16, when the lure is in the relaxed state. A dorsoventral axis extends perpendicularly to the anteroposterior axis of body 16 through a center of length L2. Body 16 is characterized by three sections including a cylindrically-shaped ribbed section 30, a bulbous section 32 and a slotted section 34. Ribbed section 30 includes ribs that are angled away from the direction of travel of lure 10 through water and configured to enable a fish to more easily hold onto the lure when the lure is bitten by the fish. Slotted section 34 has a generally cylindrical shape with four opposing, spaced-apart, laterally-extending, open slots that angle posteriorly moving from ventral side 28 to dorsal side 26 of body 16. The slots are defined by a flat, elongate medial portion having exposed, opposing right-to-left lateral faces and a thickness substantially similar to that of transition section 20 and spaced apart, opposing protrusions extending laterally to the opposing right-to-left opposing faces. The slots are provided to facilitate left-to-right lateral movement of tail 18 and transition section 20 relative to body 16 along the exposed right-to-left lateral faces the slotted section 30 in support of the desired undulatory locomotion movement pattern of the lure when retrieved in water.

Tail 18 includes a length L3 that extends from end surface 13 to the plane that is arranged tangentially to inside surface 22 and perpendicular to the anteroposterior axis of body 16, when the lure is in the relaxed state. As illustrated in FIGS. 3 and 4, when lure 10 is in the relaxed state tail 18 extends proximally from transition section 20 along and adjacent to dorsal side 26 of body 16 such that posterior end portion 14 of tail 18 lies next to anterior end portion 12 of body 16. In the relaxed state, lure 10 forms an elongated tear-drop shape with transition section 20 forming a bottom of the tear drop and body 16 and tail 18 forming the sides and upper portions of the tear drop.

Referring to FIGS. 1 through 3, so that tail 18 exhibits the desired undulatory locomotion movement pattern, tail 18 includes spaced-apart, opposing laterally extending sections 40 separated from one another by a thin, elongate medial portion 44 that extends from and is aligned with a posterior portion of transition section 20 to posterior end portion 14. Medial portion 44 and sections 40 define rectangular, opposing exposed right-to left lateral faces 46, 48 which separate section 40 from one another. When in the relaxed state, elongate medial portion 44 of tail 18 is intersected by the dorsoventral axis of body 16 and extends along a plane defined by the dorsoventral axis and anteroposterior axis of body 16. Tail 16, section 40, faces 46, 48 and medial portion 44 taper to a point ending at posterior surface 13.

Figure 6:
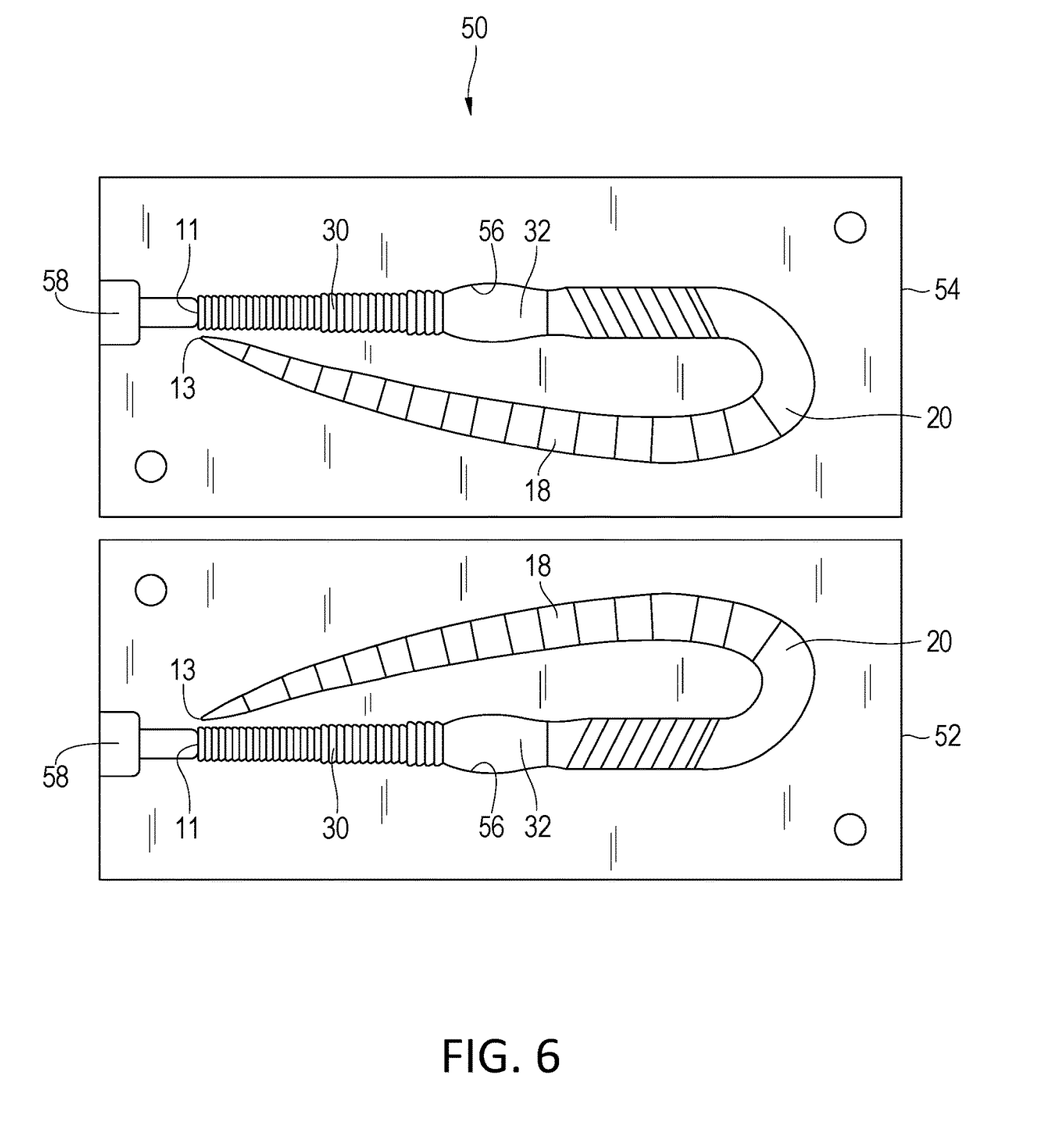
FIG. 6 is a top plan view of a fishing lure mold in accordance with the present invention.

Referring to FIG. 6, there is depicted a mold 50 for forming lure 10. Mold 50 includes a left half 52 and a right half 54, each including an impression 56 of either the left of the right halves of lure 10. Those portions of impression 56 that correlate to portions of lure 10 share the numerical designations of lure 10, as provided in FIGS. 1 through 5. When it is desired to make lure 10, left half 52 and right half 54 are aligned and pressed together. A molten plastic is then injected through a port defined by entryways 58 formed in left half 52 and a right half 54 of mold 50. The molten plastic fills impression 56 and is cooled. Once the plastic is cooled, left half 52 and a right half 54 are separated revealing lure 10 located in either left half 52 and a right half 54 and in the relaxed state.

In use, a hook is anchored within anterior end portion 12 of body 16. The hook is tethered to a fishing line operatively coupled to a fishing rod and reel. Lure 10 is cast and then retrieved through a body of water. When retrieved through the body of water, lure 10 exhibits the orientation illustrated in FIGS. 1, 2 and 5, that is, inside surface 22 is essentially straight and extends parallel to a longitudinal axis of body 16, while outside surface 24 and opposing faces 21, 23 form a 90° twist that transitions opposing faces 21, 23 from a left-right lateral facing orientation to a dorsoventral orientation moving posteriorly from body 16. Tail 18 then exhibits the desired undulatory locomotion movement pattern, which may include a right-to-left lateral movement or a dorsoventral movement along tail 18, transition section 20 and/or slotted section 34. Because this movement mimics one of several food sources for fish, fish are enticed to strike lure 10.

Referring to FIGS. 7 and 8, there is depicted a soft plastic fishing lure 100 which may be configured to mimic sub-carangiform, carangiform or thunniform animals. Lure 100 includes a head 110, a tail 112 and a body 114 extending to and between the head and the tail. Tail 112 may have a forked, lunate, truncate, pointed, rounded, heterocercal or emarginated shape. So that fishing lure 100 exhibits the desired locomotion movement pattern when retrieved through water, body 110 includes a medial portion 116 having a first face 118 and an opposing second face 120 and a plurality of spaced-apart, opposing laterally extending portions. Each of the opposing laterally extending portions includes a first lateral portion 122 extending laterally from first face 118 of medial portion 116 and a second lateral portion 124 extending laterally from second face 120 of the medial portion. Each lateral portion 122, 124 has a thickness extending laterally that is at least two to three times the thickness of medial portion 116. Opposing slots separate adjacent laterally extending portions, each of the opposing slots including a first lateral portion 126 extending and opening laterally from first face 118 of medial portion 116 and a second lateral portion 128 extending and opening laterally from second face 120 of the medial portion.

So that fishing lure 100 exhibits the desired locomotion movement pattern when retrieved through water at a desired speed, body 114 includes a curved or angled portion 130 located at the dorsoventral axis of the lure. As illustrated in FIG. 7, angled portion 130 divides lure 100 into anterior and posterior sections 132, 134, respectively, which are off-set from one another along their respective anteroposterior axes 133, 135. Axes 133, 135 intersect within body 110 at an angle A of about 170° when the lure is in a relaxed state. While the location of the intersection with body 110 is described as being at the dorsoventral axis of the lure, it is understood that the location may vary depending on the type of locomotion pattern that is desired.

Depending on the length of body 110, location of angle A and the desired locomotion pattern and retrieval speed, angle A may range between 45° and 175° and between 90° to 170°. By off-setting anterior and posterior sections 132, 134 along their respective anteroposterior axes at an angle of about 170°, it was found unexpectedly that lure 100 may exhibit sub-carangiform, carangiform or thunniform locomotion by retrieving the lure at speeds that are less than if the anterior and posterior sections were not off-set, but rather aligned to form a single anteroposterior axis.

As will be apparent to one skilled in the art, various modifications can be made within the scope of the aforesaid description. Such modifications being within the ability of one skilled in the art form a part of the present invention and are embraced by the claims below. For example, is contemplated that the dorsal and ventral sides of the body of lure may be reversed depending on the orientation of the lure as it is retrieved through water.

What is claimed is:

1. A plastic fishing lure comprising:
a body forming an anterior portion of the fishing lure,
a tail forming a posterior portion of the fishing lure, the tail including (i) an elongate medial portion having a first face and an opposing second face, (ii) a plurality of spaced-apart, opposing laterally extending portions, each of the opposing laterally extending portions including a first lateral portion extending laterally from the first face of the medial portion and a second lateral portion extending laterally from the second face of the medial portion, and (iii) a plurality of spaced-apart, opposing slots, each of the opposing slots including a first lateral portion extending and opening laterally from the first face of the medial portion and a second lateral portion extending and opening laterally from the second face of the medial portion, and
a substantially U-shaped transition section coupling the body with the tail.

2. The fishing lure of claim 1 wherein, when the fishing lure is in the relaxed state, the tail extends substantially anteriorly along at least half of a length of the body.

3. The fishing lure of claim 1 wherein, when the fishing lure is in the relaxed state, the anterior portion is adjacent to the posterior portion.

4. The fishing lure of claim 1 wherein, when the lure is in the relaxed state, the body includes a dorsoventral axis that extends dorsally through the tail and an anteroposterior axis that does not extend through the tail.

* * * * *